United States Patent
Taguchi et al.

(10) Patent No.: US 12,228,645 B2
(45) Date of Patent: Feb. 18, 2025

(54) DISTANCE-MEASURING SENSOR

(71) Applicant: FUJIFILM Corporation, Tokyo (JP)

(72) Inventors: Takao Taguchi, Minamiashigara (JP);
Yukito Saitoh, Minamiashigara (JP);
Hiroshi Sato, Minamiashigara (JP);
Katsumi Sasata, Minamiashigara (JP);
Akiko Watano, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 486 days.

(21) Appl. No.: 17/521,983

(22) Filed: Nov. 9, 2021

(65) Prior Publication Data
US 2022/0066030 A1 Mar. 3, 2022

Related U.S. Application Data

(63) Continuation of application No. PCT/JP2020/018553, filed on May 7, 2020.

(30) Foreign Application Priority Data

May 10, 2019 (JP) .................................. 2019-089780
Dec. 27, 2019 (JP) .................................. 2019-238684

(51) Int. Cl.
*G01S 17/08* (2006.01)
*G02B 1/08* (2006.01)
(Continued)

(52) U.S. Cl.
CPC ............... *G01S 17/08* (2013.01); *G02B 1/08* (2013.01); *G02B 5/3016* (2013.01);
(Continued)

(58) Field of Classification Search
CPC ......... G02F 1/133543; G02F 2201/343; G02F 1/13718
See application file for complete search history.

(56) References Cited

U.S. PATENT DOCUMENTS

2003/0028048 A1* 2/2003 Cherkaoui ........... C09K 19/586
560/66
2005/0249257 A1 11/2005 Leyrer et al.
(Continued)

FOREIGN PATENT DOCUMENTS

CN 105131300 A 12/2015
JP 2004-333671 A 11/2004
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/018553, dated Nov. 25, 2021, with an English translation.
(Continued)

*Primary Examiner* — Lauren Nguyen
(74) *Attorney, Agent, or Firm* — Birch, Stewart, Kolasch & Birch, LLP

(57) ABSTRACT

Provided is a sensor having a high SN ratio. The sensor includes a light source, a band pass filter; and a light-receiving element, in which the band pass filter includes a cholesteric liquid crystal layer that is a layer obtained by immobilizing a cholesteric liquid crystalline phase, the cholesteric liquid crystal layer has a region where a refractive index nx in an in-plane slow axis direction and a refractive index ny in an in-plane fast axis direction satisfy nx>ny, and in a case where a selective reflection wavelength of the cholesteric liquid crystal layer is represented by λ, the cholesteric liquid crystal layer has a second selective reflection peak at a wavelength λ/2 and a half-width of the second selective reflection peak at λ/2 is 30 nm or less.

20 Claims, 6 Drawing Sheets

(51) Int. Cl.
*G02B 5/20* (2006.01)
*G02B 5/30* (2006.01)
*G02F 1/1335* (2006.01)
*G02F 1/137* (2006.01)

(52) U.S. Cl.
CPC .... *G02F 1/133543* (2021.01); *G02F 1/13718* (2013.01); *G02B 5/20* (2013.01); *G02F 2201/343* (2013.01)

(56) References Cited

U.S. PATENT DOCUMENTS

| | | |
|---|---|---|
| 2006/0209238 A1 | 9/2006 | Shiraogawa et al. |
| 2007/0064168 A1* | 3/2007 | Shiraogawa ......... G02B 6/0056 349/56 |
| 2008/0145680 A1* | 6/2008 | Kawamoto ....... G02F 1/133634 428/500 |
| 2010/0118123 A1 | 5/2010 | Freedman et al. |
| 2011/0158481 A1 | 6/2011 | Chang |
| 2013/0027656 A1 | 1/2013 | Escuti et al. |
| 2013/0162931 A1 | 6/2013 | Hsieh et al. |
| 2016/0169664 A1 | 6/2016 | Hayashi et al. |
| 2017/0052395 A1 | 2/2017 | Wu et al. |
| 2017/0108701 A1 | 4/2017 | Wu et al. |
| 2018/0151630 A1* | 5/2018 | Yamaoka ............... H10K 50/13 |
| 2018/0164480 A1 | 6/2018 | Yoshida |
| 2018/0196179 A1 | 7/2018 | Takishita et al. |
| 2020/0081170 A1 | 3/2020 | Saitoh et al. |

FOREIGN PATENT DOCUMENTS

| | | |
|---|---|---|
| JP | 2005-350626 A | 12/2005 |
| JP | 2005-536898 A | 12/2005 |
| JP | 2014-528597 A | 10/2014 |
| JP | 2018-509639 A | 4/2018 |
| WO | WO2015/030176 A1 | 3/2015 |
| WO | WO2015/087709 A1 | 6/2015 |
| WO | WO2016/194961 A1 | 12/2016 |
| WO | WO2017/056909 A1 | 4/2017 |
| WO | WO2018/212348 A1 | 11/2018 |

OTHER PUBLICATIONS

International Search Report (Form PCT/ISA/210) for International Application No. PCT/JP2020/018553, dated Aug. 11, 2020, with an English translation.

U.S. Office Action for U.S. Appl. No. 17/522,457, dated Mar. 31, 2023.

Japanese Notice of Reasons for Refusal for corresponding Japanese Application No. 2021-519400, dated Oct. 4, 2022, with an English translation.

* cited by examiner

DISTANCE-MEASURING SENSOR

CROSS-REFERENCE TO RELATED APPLICATIONS

This application is a Continuation of PCT International Application No. PCT/JP2020/018553 filed on May 7, 2020, which claims priority under 35 U.S.C. § 119(a) to Japanese Patent Application No. 2019-238684 filed on Dec. 27, 2019 and Japanese Patent Application No. 2019-089780 filed on May 10, 2019. Each of the above applications is hereby expressly incorporated by reference, in its entirety, into the present application.

BACKGROUND OF THE INVENTION

1. Field of the Invention

The present invention relates to a sensor that is used for a distance measurement device or the like.

2. Description of the Related Art

A distance-measuring sensor (depth sensor) for measuring the distance to an object is used for motion capture, automated driving of a vehicle, automatic driving of a robot, and the like.

For example, US2010/0118123A describes a time-of-flight type distance-measuring sensor (optical distance sensor), in which the distance to a measurement target object is calculated based on a phase difference between blinking infrared light and light reflected from the measurement target object.

Specifically, US2010/0118123A describes that infrared light is emitted to the measurement target object as blinking light corresponding to a light-emitting signal, infrared light reflected from the measurement target object is received to generate a light-receiving signal, a time difference between waveforms (for example, pulse waveforms) of the light-emitting signal and the light-receiving signal, that is, a phase difference is obtained, and the distance between the optical distance sensor and the measurement target object is obtained based on this phase difference.

SUMMARY OF THE INVENTION

In addition to the distance-measuring sensor, a sensor that performs optical measurement performs various types of measurement, for example, by emitting measurement light from a light source, measuring the measurement light reflected from an object with a light-receiving element, and analyzing the measurement result.

Here, in a space where the sensor performs the measurement, various light components such as sunlight or a lighting are present, and these light components are incident into the light-receiving element as so-called external light.

Here, the external light may include light in a wavelength range emitted from a light source and light for which the light-receiving element has sensitivity. In a case where the external light is incident into the light-receiving element of the sensor, the external light becomes noise such that the signal-noise ratio (SN ratio) of the sensor decreases and the measurement accuracy of the sensor decreases.

An object of the present invention is to solve the above-described problem of the related art and to provide: a sensor such as a distance-measuring sensor in which external light becoming noise is prevented from being incident into a light-receiving element such that high-accuracy measurement can be performed at a high SN ratio.

In order to achieve the object, the present invention has the following configurations.

[1] A sensor comprising:
a light source;
a band pass filter; and
a light-receiving element,
in which the band pass filter includes a cholesteric liquid crystal layer that is a layer obtained by immobilizing a cholesteric liquid crystalline phase,
the cholesteric liquid crystal layer has a region where a refractive index nx in an in-plane slow axis direction and a refractive index ny in an in-plane fast axis direction satisfy nx>ny, and
in a case where a selective reflection center wavelength of the cholesteric liquid crystal layer is represented by λ, the cholesteric liquid crystal layer has a second selective reflection peak at a wavelength λ/2 and a half-width of the second selective reflection peak at λ/2 is 30 nm or less.

[2] The sensor according to [1],
in which an absolute value of an in-plane phase difference Re of the cholesteric liquid crystal layer is 10 nm or more.

[3] The sensor according to [1] or [2],
in which the cholesteric liquid crystal layer has a third selective reflection peak at a wavelength λ/3 and a half-width of the third selective reflection peak at λ/3 is 30 nm or less.

[4] The sensor according to any one of [1] to [3],
in which a half-width of a selective reflection peak at the selective reflection center wavelength of the cholesteric liquid crystal layer is 30 nm or more.

[5] The sensor according to any one of [1] to [4],
in which the cholesteric liquid crystal layer consists of a liquid crystal elastomer.

[6] The sensor according to any one of [1] to [5],
in which the cholesteric liquid crystal layer is a liquid crystal elastomer having temperature responsiveness in which the selective reflection peak at the selective reflection center wavelength is shifted to a longer wavelength side along with a temperature increase.

[7] The sensor according to any one of [1] to [6], further comprising:
an external displacement mechanism that expands the liquid crystal cholesteric liquid crystal layer.

[8] The sensor according to any one of [1] to [7] further comprising:
at least one of a light shielding member that shields 80% or more of light in a wavelength range of λ−100 nm or more or a light shielding member that shields 80% or more of light in a wavelength range of λ/2-50 nm or less.

According to the present invention, it is possible to provide a sensor in which external light becoming noise is prevented from being incident into a light-receiving element such that high-accuracy measurement can be performed at a high SN ratio.

DESCRIPTION OF THE PREFERRED EMBODIMENTS

Hereinafter, a sensor according to an embodiment of the present invention will be described in detail based on preferable embodiments shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" and "equal" includes a case where an error range is generally allowable in the technical field.

In the present specification, a selective reflection center wavelength refers to an average value of two wavelengths at which, in a case where a minimum value of a transmittance of a target object (member) is represented by Tmin (%), a half value transmittance: T1/2(%) represented by the following expression is exhibited.

Expression for obtaining Half Value Transmittance:
$T1/2 = 100 - (100 - Tmin) \div 2$

[Sensor]

The sensor according to the embodiment of the present invention comprises:
 a light source;
 a band pass filter; and
 a light-receiving element,
 in which the band pass filter includes a cholesteric liquid crystal layer that is a layer obtained by immobilizing a cholesteric liquid crystalline phase,
 the cholesteric liquid crystal layer has a region where a refractive index nx in an in-plane slow axis direction and a refractive index ny in an in-plane fast axis direction satisfy nx>ny, and
 in a case where a selective reflection center wavelength of the cholesteric liquid crystal layer is represented by λ, the cholesteric liquid crystal layer has a second selective reflection peak at a wavelength λ/2 and a half-width of the second selective reflection peak at λ/2 is 30 nm or less.

Figure 1:
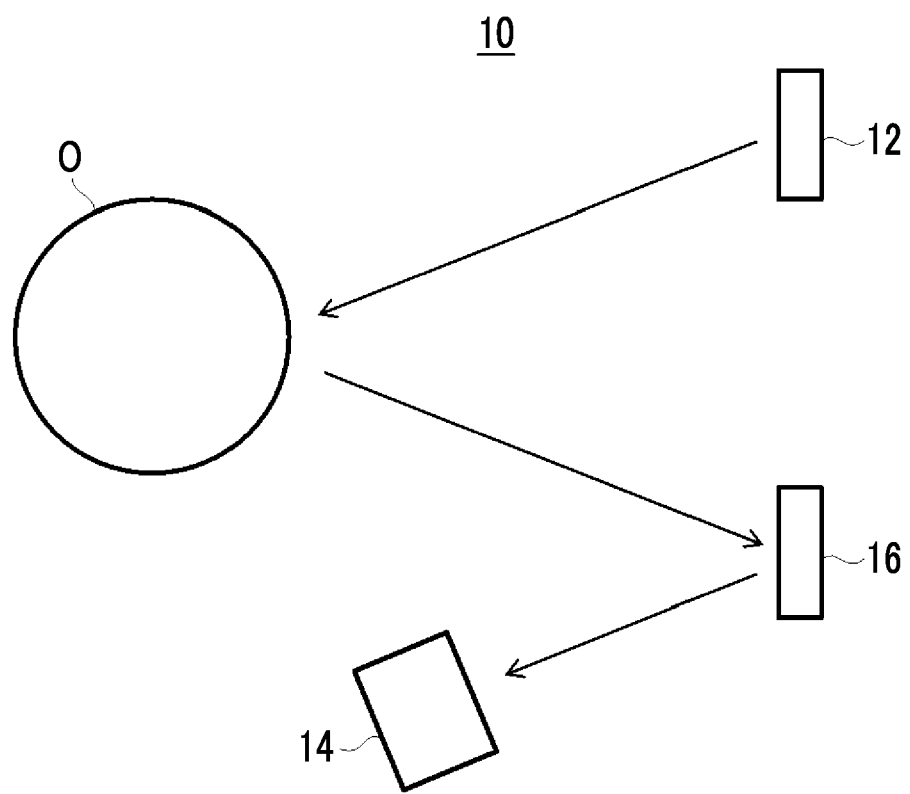
FIG. 1 is a diagram conceptually showing an example of a sensor according to the present invention.

FIG. 1 is a diagram conceptually showing an example of the sensor according to the present invention.

A sensor 10 shown in FIG. 1 includes a light source 12, a light-receiving element 14, and a band pass filter 16.

As shown in FIG. 1, the light source 12 is disposed such that measurement light is emitted to the outside (object O). The band pass filter 16 is disposed such that measurement light incident at a predetermined angle in the measurement light reflected from the object O is reflected to the light-receiving element 14. The light-receiving element 14 is disposed at a position where measurement light reflected from the band pass filter 16 is received.

The sensor 10 performs photometry on measurement light that is emitted from the light source 12 and reflected from the object O using the light-receiving element 14 through the band pass filter 16 and analyzes the photometry result to measure the distance to the object O and the like (hereinafter, also simply referred to as "measurement of the object"). Here, the band pass filter 16 uses the cholesteric liquid crystal layer, and allows transmission of only light in a wide wavelength range of the selective reflection wavelength range of the cholesteric liquid crystal layer. In the present invention, the cholesteric liquid crystal layer is configured to have a region where a refractive index nx in an in-plane slow axis direction and a refractive index ny in an in-plane fast axis direction satisfy nx>ny. As a result, the cholesteric liquid crystal layer can be configured to have the second selective reflection peak having a narrow half-width at a wavelength that is ½ of the selective reflection center wavelength. By using the second selective reflection peak having a narrow half-width in the cholesteric liquid crystal layer, only light in a narrow wavelength range can be made to be incident into the light-receiving element 14. Therefore, the sensor 10 according to the embodiment of the present invention can reduce of the influence of external light such that high-accuracy measurement can be performed at a high SN ratio.

The measurement of the object O by the sensor 10 according to the embodiment of the present invention can be applied to various well-known measurements that are performed by an optical sensor. Accordingly, the object O is not particularly limited and may be a person, an animal, or a thing.

Examples of the measurement of the object O include measurement of the distance to the object O (distance measurement), measurement of the shape of the object O, measurement of the movement of the object O, and identification of the object O.

All of these measurements may be performed using a well-known method. For example, the sensor 10 measures the distance to the object O using a time of flight (ToF) method.

[Light Source]

The light source 12 is not particularly limited and all of the various well-known light sources that are used as a light source in an optical sensor can be used.

Examples of the light source include an electric lamp such as a mercury lamp, a fluorescent lamp, a halogen lamp, a light emitting diode (LED), and a laser such as a semiconductor laser.

The light emitted from the light source 12 may be either diffused light or parallel light such as a collimated light beam. In addition, in the sensor 10, optionally, light emitted from the light source 12 may be scanned one-dimensionally or two-dimensionally.

The wavelength of light emitted from the light source 12 is not particularly limited and may be visible light or invisible light such as infrared light or ultraviolet light. In particular, the infrared light as the invisible light is suitably used as the light emitted from the light source 12.

Further, the light emitted from the light source 12 may be unpolarized light or polarized light. In a case where polarized light is emitted from the light source 12, the emitted light may be linearly polarized light or circularly polarized light.

[Light-Receiving Element]

The light-receiving element 14 is not particularly limited and all of the various well-known light-receiving elements (photodetectors (elements)) that are used as a light-receiving element in an optical sensor can be used.

Examples of the light-receiving element 14 include a complementary metal oxide semiconductor (CMOS) sensor and a charge coupled device (CCD) sensor.

The light-receiving element 14 may have spatial resolution. A line sensor that detects light in a line shape or an area sensor that two-dimensionally detects light is preferable, and an area sensor is more preferable.

The light-receiving element 14 measures the measurement light that is emitted from the light source 12 and is reflected from the object O through the band pass filter 16.

As described below, the band pass filter 16 causes light having a wavelength of the second selective reflection peak to be reflected from the cholesteric liquid crystal layer and to be incident into the light-receiving element 14. Accordingly, in the sensor 10 according to the embodiment of the present invention, as the light source 12, a light source that emits light having a wavelength in the wavelength range of the second selective reflection peak of the band pass filter 16 is used. In addition, as the light-receiving element 14, a light-receiving element having sensitivity to the light having a wavelength in the wavelength range of the second selective reflection peak of the band pass filter 16 is used.

[Band Pass Filter]

Figure 2:
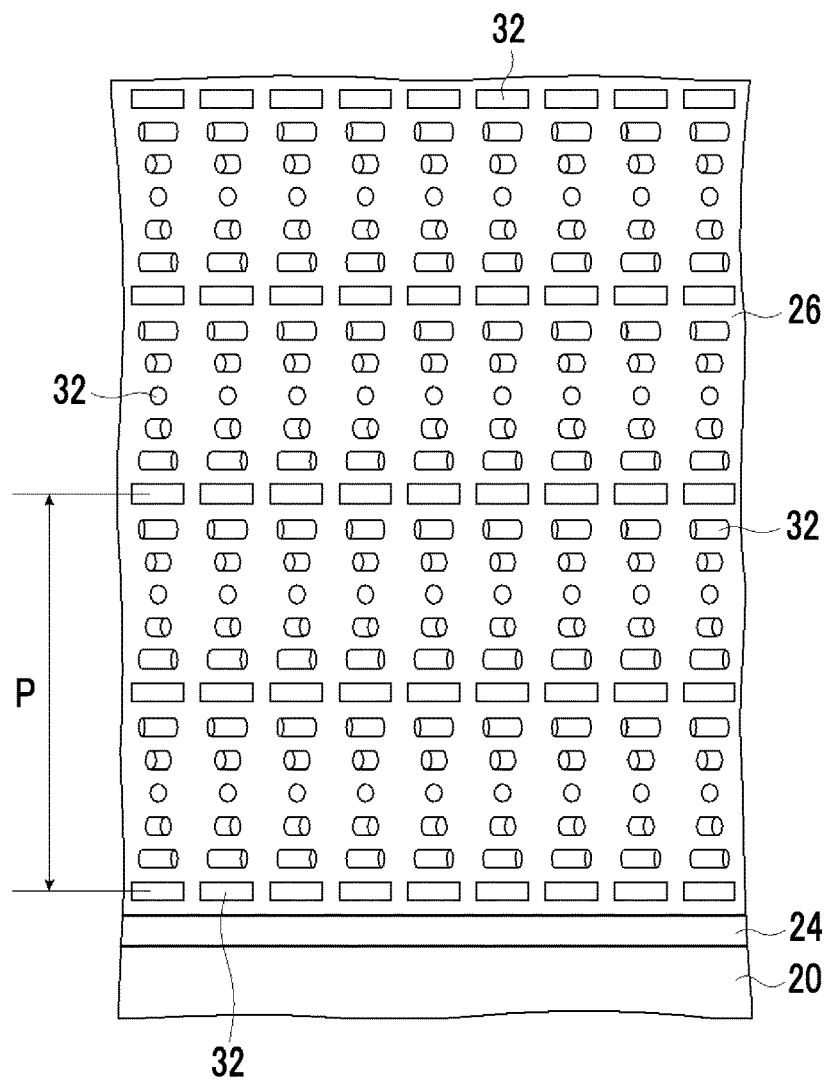
FIG. 2 is a diagram conceptually showing a cholesteric liquid crystal layer of a band pass filter in the sensor shown in FIG. 1.

FIG. 2 conceptually shows an example of the band pass filter 16.

As shown in FIG. 2, the band pass filter 16 includes a support 20, an alignment film 24, and a cholesteric liquid crystal layer 26.

In the example shown in the drawing, the thickness, size, and the like of each of the layers and the regions are appropriately adjusted in order to clearly show the configuration of the present invention and are different from the actual ones of the band pass filter according to the embodiment of the present invention.

In addition, in the following description, the support 20 side will also be referred to as "lower side", and the cholesteric liquid crystal layer 26 side will also be referred to as "upper side". Accordingly, in the support 20, the cholesteric liquid crystal layer 26 side will be referred to as "upper surface", and a side opposite to the cholesteric liquid crystal layer 26 side will be referred to as "lower surface". In addition, in the alignment film 24 and the cholesteric liquid crystal layer 26, a surface on the support 20 side will be referred to as "lower surface", and a surface opposite to the support 20 side will be referred to as "upper surface".

<Support>

The support 20 supports the alignment film 24 and the cholesteric liquid crystal layer 26.

As the support 20, various sheet-shaped materials (films or plate-shaped materials) can be used as long as they can support the alignment film 24 and the cholesteric liquid crystal layer 26.

As the support 20, a support that does not reflect light in a wavelength range other than the wavelength range of the second selective reflection peak in the cholesteric liquid crystal layer 26 and has sufficient transmittance is preferably used.

The thickness of the support 20 is not particularly limited and may be appropriately set depending on the use of the band pass filter 16, a material for forming the support 20, and the like in a range where the alignment film 24 and the cholesteric liquid crystal layer 26 can be supported.

The thickness of the support 20 is preferably 1 to 2000 µm, more preferably 3 to 500 µm, and still more preferably 5 to 250 µm.

The support 20 may have a single-layer structure or a multi-layer structure.

In a case where the support 20 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 20 has a multi-layer structure, examples thereof include a support including: one of the above-described supports having a single-layer structure that is provided as a substrate; and another layer that is provided on a surface of the substrate.

<Alignment Film>

In the band pass filter 16, the alignment film 24 is formed on a surface (upper surface) of the support 20.

The alignment film 24 is an alignment film for aligning a liquid crystal compound 32 to a predetermined alignment state during the formation of the cholesteric liquid crystal layer 26 of the band pass filter 16.

As the alignment film 24, various well-known films can be used.

Examples of the alignment film 24 include a rubbed film formed of an organic compound such as a polymer, an obliquely deposited film formed of an inorganic compound, a film having a microgroove, a film formed by lamination of Langmuir-Blodgett (LB) films formed with the Langmuir-Blodgett technique using an organic compound such as ω-tricosanoic acid, dioctadecylmethylammonium chloride, or methyl stearate, and a photo-alignment film that emits polarized light or non-polarized light to a photo-alignable material.

The alignment film 24 may be formed using a well-known method corresponding to a material for forming the alignment film.

For example, the alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-97377A, JP2005-99228A, and JP2005-128503A is preferable.

In addition, the support 20 may also function as an alignment film by performing a treatment such as a rubbing treatment or laser processing on the support 20 instead of forming the alignment film 24.

The alignment film 32 can also be suitably used as a so-called photo-alignment film obtained by irradiating a photo-alignable material with polarized light or non-polarized light. That is, a photo-alignment film that is formed by applying a photo-alignable material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitability used.

The thickness of the alignment film 24 is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

In the sensor 10 according to the embodiment of the present invention, the band pass filter 16 does not need to include the support 20 and/or the alignment film 24.

For example, after forming the cholesteric liquid crystal layer 26 on the surface of the alignment film 24, the support 20 may be peeled off or the support 20 and the alignment film 24 may be peeled off. In addition, as described above, the support 20 may also function as the alignment film by performing a rubbing treatment or the like on the support 20.

<Cholesteric Liquid Crystal Layer>

In the band pass filter 16, the cholesteric liquid crystal layer 26 is formed on the surface of the alignment film 24.

In FIG. 2, in order to simplify the drawing and to clarify the configuration of the band pass filter 16, only a portion of the cholesteric liquid crystal layer 26 corresponding to two rotations (720° rotation) in the twisted direction of the liquid crystal compound 32 in the cholesteric liquid crystalline phase is conceptually shown. That is, FIG. 2 shows only two pitches of the helical structure of the cholesteric liquid crystalline phase.

However, the cholesteric liquid crystal layer 26 has a helical structure in which the liquid crystal compound 32 is helically turned and laminated along the helical axis in the thickness direction as in a cholesteric liquid crystal layer obtained by immobilizing a typical cholesteric liquid crystalline phase. In the helical structure, a configuration in which the liquid crystal compound 32 is helically rotated once (rotated by 360°) and laminated is set as one helical pitch, and one or more pitches of the helically turned liquid crystal compound 32 are laminated.

That is, in the present invention, the cholesteric liquid crystalline phase (cholesteric liquid crystal layer) refers to a structure in which one or more pitches of the helical structures are laminated. In the cholesteric liquid crystal layer, by laminating one or more pitches of the helical structure formed of the liquid crystal compound 32, reflection properties having wavelength selectivity described below is exhibited.

Accordingly, in the present invention, regarding a layer having a helical structure in which the liquid crystal compound 32 is helically turned and laminated along the helical axis in the thickness direction, in a case where the helical pitch of the layer is less than one pitch, this layer is not a cholesteric liquid crystal layer.

The cholesteric liquid crystal layer 26 is obtained by immobilizing a cholesteric liquid crystalline phase. That is, the cholesteric liquid crystal layer 26 is a layer obtained by cholesteric alignment of the liquid crystal compound 32 (liquid crystal material).

As is well-known, the cholesteric liquid crystal layer obtained by immobilizing a cholesteric liquid crystalline phase has Wavelength-selective reflectivity.

Although described below in detail, the selective reflection wavelength range of the cholesteric liquid crystal layer depends on the length (pitch P shown in FIG. 2) of one helical pitch described above in the thickness direction.

Here, in the present invention, in the cholesteric liquid crystal layer 26, the refractive index nx in the in-plane slow axis direction and the refractive index ny in the in-plane fast axis direction satisfy nx>ny.

Figure 3:
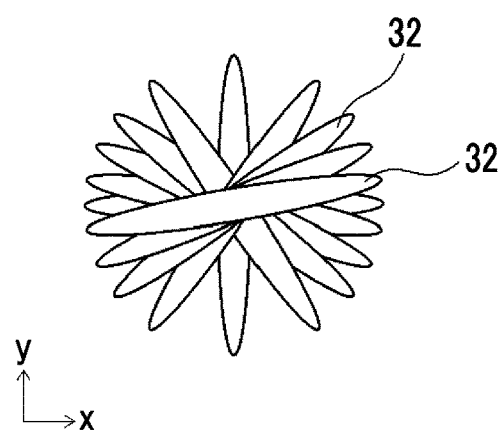
FIG. 3 is a diagram showing a part of a liquid crystal compound of the cholesteric liquid crystal layer in the band pass filter shown in FIG. 2 in case of being seen from a helical axis direction.

In the present invention, the cholesteric liquid crystal layer 26 has a configuration in which, in a case where the arrangement of the liquid crystal compound 32 is seen from the helical axis direction, an angle between the molecular axes of the liquid crystal compounds 32 adjacent to each other gradually changes as shown in FIG. 3. In other words, in a case where the arrangement of the liquid crystal compound 32 is seen from the helical axis direction, the existence probability of the liquid crystal compound 32 varies. As a result, the cholesteric liquid crystal layer 26 has a configuration where a refractive index nx in the in-plane slow axis direction and a refractive index ny in the in-plane fast axis direction satisfy nx>ny.

In the following description, the cholesteric liquid crystal layer 26 having a configuration in which, in a case where the arrangement of the liquid crystal compound 32 is seen from the helical axis direction, an angle between the molecular axes of the liquid crystal compounds 32 adjacent to each other gradually changes as shown in FIG. 3 will also be referred to as the cholesteric liquid crystal layer 26 having a refractive index ellipsoid.

The cholesteric liquid crystal layer 26 has the configuration in which the refractive index nx in the in-plane slow axis direction and the refractive index ny in the in-plane fast axis direction satisfy nx>ny. As a result, as reflected light to be reflected from the cholesteric liquid crystal layer 26, primary light and secondary light are obtained. At this time, the secondary light is obtained as light in a very narrower wavelength range than that of the primary light. The selective central reflection wavelength of the secondary light is half of the selective central reflection wavelength of the primary light. An action of the cholesteric liquid crystal layer 26 (band pass filter 16) will be described below in detail. In the present invention, the primary light refers to light corresponding to the selective reflection peak (hereinafter, also referred to as "first selective reflection peak") at the selective reflection center wavelength of the cholesteric liquid crystal layer. The secondary light refers to light corresponding to the second selective reflection peak in the present invention.

<<Cholesteric Liquid Crystalline Phase>>

It is known that the cholesteric liquid crystalline phase exhibits selective reflectivity at a specific wavelength.

A center wavelength of selective reflection (selective reflection center wavelength) of a general cholesteric liquid crystalline phase depends on a helical pitch P in the cholesteric liquid crystalline phase and complies with a relationship of $\lambda = n \times P$ with an average refractive index n of the cholesteric liquid crystalline phase. Therefore, the selective reflection center wavelength can be adjusted by adjusting the helical pitch. In the present invention, light having a wavelength to be reflected according to the relationship of $\lambda = n \times P$ is primary light.

The selective reflection center wavelength of the cholesteric liquid crystalline phase increases as the pitch P increases.

As described above, the helical pitch P refers to one pitch (helical period) of the helical structure of the cholesteric liquid crystalline phase, in other words, one helical turn. That is, the helical pitch refers to the length in a helical axis direction in which a director (in the case of a rod-shaped liquid crystal, a major axis direction) of the liquid crystal compound constituting the cholesteric liquid crystalline phase rotates by 360°.

In a case where a cross-section of the cholesteric liquid crystal layer is observed with a scanning electron microscope (SEM), a stripe pattern in which bright lines (bright portions) and dark lines (dark portions) derived from a cholesteric liquid crystalline phase are alternately laminated in the thickness direction is observed. The helical pitch, that is, the pitch P is equal to the length corresponding to two bright lines and two dark lines in the thickness direction, that is, the length corresponding to two dark lines and two bright lines in the thickness direction.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected. Accordingly, the helical twisted direction in the cholesteric liquid crystalline phase can be verified by causing right circularly polarized light and/or left circularly polarized light to be incident into the cholesteric liquid crystal layer.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection wavelength range (circularly polarized light reflection wavelength range) where selective reflection is exhibited, that is, the half-width of the primary light depends on $\Delta n$ of the cholesteric liquid crystalline phase and the helical pitch P and complies with a relationship of $\Delta\lambda = \Delta n \times P$. Therefore, the width of the selective reflection wavelength range of the primary light can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the primary light may be adjusted depending on the use of the band pass filter 16. The half-width of the primary light may be, for example, 30 nm or more.

The selective reflection center wavelength in the cholesteric liquid crystal layer is not particularly limited, and may be appropriately set depending on the use of the sensor 10 using the band pass filter 16.

Specifically, in the cholesteric liquid crystal layer, the selective reflection center wavelength may be appropriately set depending on the wavelength of the measurement light used in the sensor 10. Although described below, the sensor 10 receives the light in the wavelength range of the second selective reflection peak of the band pass filter 16 with the light-receiving element 14. The wavelength of the second selective reflection peak refers to a wavelength that is ½ of the selective reflection center wavelength of the cholesteric liquid crystal layer. Accordingly, the selective reflection center wavelength of the cholesteric liquid crystal layer is set such that the wavelength of the second selective reflection peak is included in the wavelength range of the measurement light.

As described above, the selective reflection center wavelength of the cholesteric liquid crystal layer depends on the pitch P of the helical structure. Accordingly, the pitch P of the helical structure may be set such that the wavelength of the second selective reflection peak is included in the wavelength range of the measurement light. The pitch P of the helical structure can be verified by analyzing the stripe pattern in which bright lines and dark lines derived from a cholesteric liquid crystalline phase are alternately laminated in the thickness direction in a case where a cross-section of the cholesteric liquid crystal layer is observed with a SEM.

<<Method of Forming Cholesteric Liquid Crystal Layer>>

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

<<Polymerizable Liquid Crystal Compound (Rod-Shaped Liquid Crystal Compound>>

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

<<Disk-Shaped Liquid Crystal Compound>>

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

<<Surfactant>>

The liquid crystal composition used for forming the cholesteric liquid crystal layer may include a surfactant.

It is preferable that the surfactant is a compound that can function as an alignment control agent contributing to the stable or rapid alignment of a cholesteric liquid crystalline phase. Examples of the surfactant include a silicone surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

<<Chiral Agent (Optically Active Compound)>>

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by emission of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

<<Polymerization Initiator>>

In a case where the liquid crystal composition includes a polymerizable compound, it is preferable that the liquid crystal composition includes a polymerization initiator. In an aspect where a polymerization reaction progresses with ultraviolet emission, it is preferable that the polymerization initiator is a photopolymerization initiator which initiates a polymerization reaction with ultraviolet emission.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

In particular, it is preferable that the polymerization initiator is a dichroic radical polymerization initiator.

The dichroic radical polymerization initiator refers to a polymerization initiator that has absorption selectivity with respect to light in a specific polarization direction and is excited by the polarized light to generate a free radical among photopolymerization initiators. That is, the dichroic radical polymerization initiator refers to a polymerization initiator having different absorption selectivities between light in a specific polarization direction and light in a polarization direction perpendicular to the light in the specific polarization direction.

The details and specific examples are described in the pamphlet of WO2003/054111.

Specific examples of the dichroic radical polymerization initiator include polymerization initiators represented by the following chemical formulae. In addition, as the dichroic radical polymerization initiator, a polymerization initiator described in paragraphs "0046" to "0097" of JP2016-535863A.

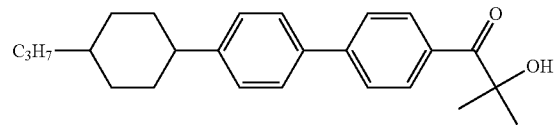

The content of the photopolymerization initiator in the liquid crystal composition is preferably 0.1 to 20 mass % and more preferably 0.5 to 12 mass % with respect to the content of the liquid crystal compound.

<<Crosslinking Agent>>

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

<<Other Additives>>

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

For example, in a case where the cholesteric liquid crystal layer 26 is formed on the alignment film 24, it is preferable that the cholesteric liquid crystal layer 26 obtained by immobilizing a cholesteric liquid crystalline phase is formed by applying the liquid crystal composition to the alignment film 24, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light emission may be performed, and photopolymerization is preferable. Regarding the light emission, ultraviolet light is preferably used. The emission energy is preferably 20 mJ/cm$^2$ to 50 J/cm$^2$ and more preferably 50 to 1500 mJ/cm$^2$. In order to promote a photopolymerization reaction, light emission may be performed under heating conditions or in a nitrogen atmosphere. The wavelength of emitted ultraviolet light is preferably 250 to 430 nm.

The thickness of the cholesteric liquid crystal layer is not particularly limited, and the thickness with which a required light reflectivity can be obtained may be appropriately set depending on the use of the band pass filter 16, the light reflectivity required for the cholesteric liquid crystal layer, the material for forming the cholesteric liquid crystal layer, and the like.

(Liquid Crystal Elastomer)

A liquid crystal elastomer may be used for the cholesteric liquid crystal layer according to the embodiment of the present invention. The liquid crystal elastomer is a hybrid material of liquid crystal and an elastomer. For example, the liquid crystal elastomer has a structure in which a liquid crystalline rigid mesogenic group is introduced into a flexible polymer network having rubber elasticity. Therefore, the liquid crystal elastomer has flexible mechanical characteristics and elasticity. In addition, the alignment state of liquid crystal and the macroscopic shape of the system strongly correlate to each other. In a state where the alignment state of liquid crystal changes depending on a temperature, an electric field, or the like, macroscopic deformation corresponding to a change in alignment degree occurs. For example, in a case where the liquid crystal elastomer is heated up to a temperature at which a nematic phase is transformed into an isotropic phase of random alignment, a sample contracts in a director direction, and the contraction amount thereof increases along with a temperature increase, that is, the alignment degree of liquid crystal decreases. The deformation is thermoreversible, and the liquid crystal elastomer returns to its original shape in a case where it is cooled to the temperature of the nematic phase again. On the other hand, in a case where the liquid crystal elastomer of the cholesteric phase is heated such that the alignment degree of liquid crystal decreases, the macroscopic elongational deformation of the helical axis direction occurs. Therefore, the helical pitch length increases, and the reflection center wavelength of the selective reflection peak is shifted to a longer wavelength side. This change is also thermoreversible, and as the liquid crystal elastomer is cooled, the reflection center wavelength returns to a shorter wavelength side.

<<Refractive Index Ellipsoid of Cholesteric Liquid Crystal Layer>>

As described above, the cholesteric liquid crystal layer 26 has the refractive index ellipsoid having the configuration in which, in a case where the arrangement of the liquid crystal compound 32 is seen from the helical axis direction, an angle between the molecular axes of the liquid crystal compounds 32 adjacent to each other gradually changes.

The refractive index ellipsoid will be described using FIGS. 4 and 5.

Figure 4:
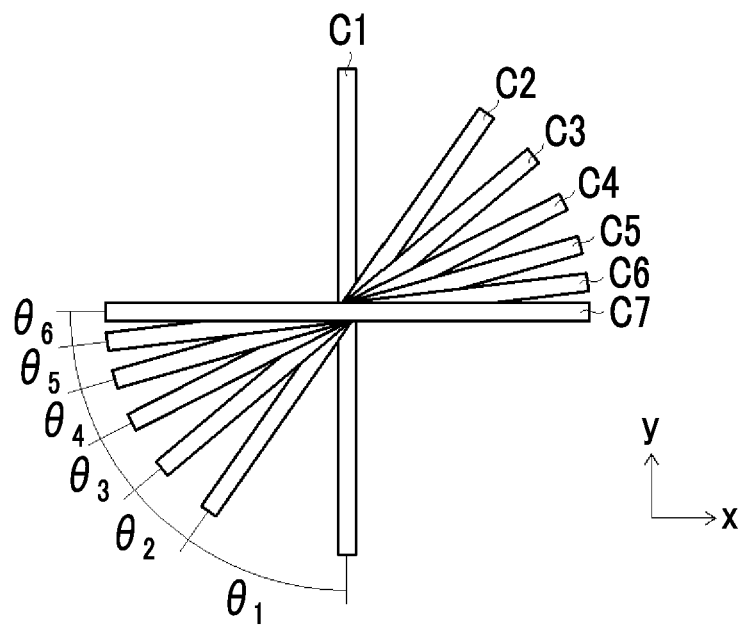
FIG. 4 is a diagram showing a part of a plurality of liquid crystal compounds that are twisted and aligned along a helical axis in case of being seen from a helical axis direction.

FIG. 4 is a diagram showing a part (¼ pitch portion) of a plurality of liquid crystal compounds that are twisted and aligned along a helical axis in case of being seen from a helical axis direction (y direction). FIG. 5 is a diagram conceptually showing an existence probability of the liquid crystal compound seen from the helical axis direction.

In FIG. 4, a liquid crystal compound having a molecular axis parallel to the y direction is represented by C1, a liquid crystal compound having a molecular axis parallel to the x direction is represented by C7, and liquid crystal compounds between C1 and C7 are represented by C2 to C6 in order from the liquid crystal compound C1 side to the liquid crystal compound C7 side. The liquid crystal compounds C1 to C7 are twisted and aligned along the helical axis, and the liquid crystal compound rotates by 90° from the liquid crystal compound C1 to the liquid crystal compound C7. In a case where the length between the liquid crystal compounds over which the angle of the liquid crystal compound that is twisted and aligned changes by 360° is set as 1 pitch ("P" in FIG. 2), the length between the liquid crystal compound C1 and the liquid crystal compound C7 is set as ¼ pitch.

As shown in FIG. 4, in the ¼ pitch from the liquid crystal compound C1 to the liquid crystal compound C7, the angle between the molecular axes of the liquid crystal compounds adjacent to each other in case of being seen from the z direction (helical axis direction) varies. In the example shown in FIG. 4, an angle $\theta_1$ between the liquid crystal compound C1 and the liquid crystal compound C2 is more than an angle $\theta_2$ between the liquid crystal compound C2 and the liquid crystal compound C3, the angle $\theta_2$ between the liquid crystal compound C2 and the liquid crystal compound C3 is more than an angle $\theta_3$ between the liquid crystal compound C3 and the liquid crystal compound C4, the angle $\theta_3$ between the liquid crystal compound C3 and the liquid crystal compound C4 is more than an angle $\theta_4$ between the liquid crystal compound C4 and the liquid crystal compound C5, the angle $\theta_4$ between the liquid crystal compound C4 and the liquid crystal compound C5 is more than an angle $\theta_5$ between the liquid crystal compound C5 and the liquid crystal compound C6, the angle $\theta_5$ between the liquid crystal compound C5 and the liquid crystal compound C6 is more than an angle $\theta_6$ between the liquid crystal compound C6 and the liquid crystal compound C7, and the angle $\theta_6$ between the liquid crystal compound C6 and the liquid crystal compound C7 is the smallest.

That is, the liquid crystal compounds C1 to C7 are twisted and aligned such that the angle between the molecular axes of the liquid crystal compounds adjacent to each other decreases in order from the liquid crystal compound C1 side toward the liquid crystal compound C7 side.

For example, in a case where the interval between the liquid crystal compounds (the interval in the thickness direction) is substantially regular, the rotation angle per unit length decreases in order from the liquid crystal compound C1 side to the liquid crystal compound C7 side in the ¼ pitch from the liquid crystal compound C1 to the liquid crystal compound C7.

In the cholesteric liquid crystal layer 26, the configuration in which the rotation angle per unit length changes as described above in the ¼ pitch is repeated such that the liquid crystal compound is twisted and aligned.

Here, in a case where the rotation angle per unit length is constant, the angle between the molecular axes of the liquid crystal compounds adjacent to each other is constant. Therefore, the existence probability of the liquid crystal compound in case of being seen from the helical axis direction is the same in any direction.

Figure 5:
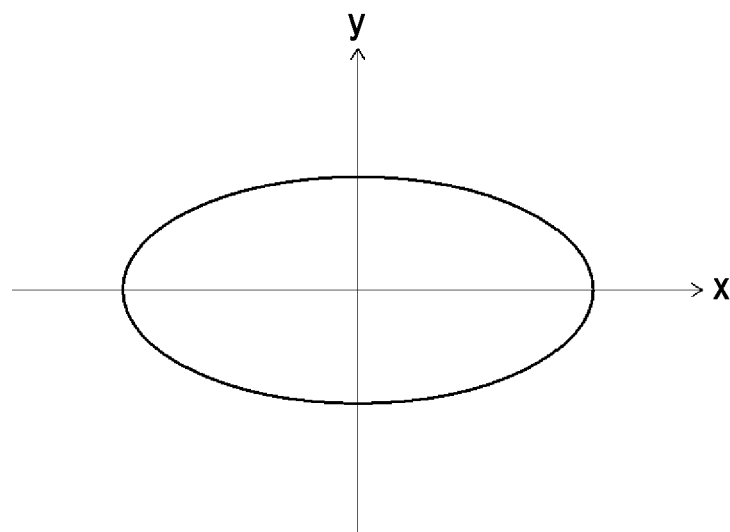
FIG. 5 is a diagram conceptually showing an existence probability of the liquid crystal compound seen from the helical axis direction in the cholesteric liquid crystal layer.

On the other hand, as described above, with the rotation angle per unit length decreases in order from the liquid crystal compound C1 side to the liquid crystal compound C7 side in the ¼ pitch from the liquid crystal compound C1 to the liquid crystal compound C7, the existence probability of the liquid crystal compound in case of being seen from the helical axis direction in the x direction is higher than that in the y direction as conceptually shown in FIG. 5. By making the existence probability of the liquid crystal compound to vary between the x direction and the y direction, the refractive index varies between the x direction and the y direction such that refractive index anisotropy occurs. In other words, refractive index anisotropy in a plane perpendicular to the helical axis occurs.

The refractive index nx in the x direction in which the existence probability of the liquid crystal compound is higher is higher than the refractive index ny in the y direction in which the existence probability of the liquid crystal compound is lower. Accordingly, the refractive index nx and the refractive index ny satisfy nx>ny.

The x direction in which the existence probability of the liquid crystal compound is higher is the in-plane slow axis direction of the cholesteric liquid crystal layer 26, and the y direction in which the existence probability of the liquid crystal compound is lower is the in-plane fast axis direction of the cholesteric liquid crystal layer 26.

This way, the configuration (the configuration having the refractive index ellipsoid) in which the rotation angle per unit length in the ¼ pitch change in the twisted alignment of the liquid crystal compound can be formed by applying a composition for forming the cholesteric liquid crystal layer and irradiating the cholesteric liquid crystalline phase (composition layer) with polarized light in a direction perpendicular to the helical axis.

The cholesteric liquid crystalline phase can be distorted by polarized light irradiation to cause in-plane retardation to occur. That is, refractive index nx>refractive index ny can be satisfied.

Specifically, the polymerization of the liquid crystal compound having a molecular axis in a direction that matches a polarization direction of irradiated polarized light progresses. At this time, only a part of the liquid crystal compound is polymerized. Therefore, a chiral agent present at this position is excluded and moves to another position.

Accordingly, at a position where the direction of the molecular axis of the liquid crystal compound is close to the polarization direction, the amount of the chiral agent decreases, and the rotation angle of the twisted alignment decreases. On the other hand, at a position where the direction of the molecular axis of the liquid crystal compound is perpendicular to the polarization direction, the amount of the chiral agent increases, and the rotation angle of the twisted alignment increases.

As a result, as shown in FIG. 4, the liquid crystal compound that is twisted and aligned along the helical axis can be configured such that, in the ¼ pitch from the liquid crystal compound having the molecular axis parallel to the polarization direction to the liquid crystal compound having the molecular axis perpendicular to the polarization direction, the angle between the molecular axes of the liquid crystal compounds adjacent to each other decreases in order from the liquid crystal compound side parallel to the polarization direction to the liquid crystal compound side perpendicular to the polarization direction. That is, by irradiating the cholesteric liquid crystalline phase with polarized light, the existence probability of the liquid crystal compound varies between the x direction and the y direction, the refractive index varies between the x direction and the y direction such that refractive index anisotropy occurs. As a result, the refractive index nx and the refractive index ny of the optical element 10 can satisfy nx>ny. That is, the cholesteric liquid crystal layer can adopt the configuration having the refractive index ellipsoid.

This polarized light irradiation may be performed at the same time as the immobilization of the cholesteric liquid crystalline phase, the immobilization may be further performed by non-polarized light irradiation after the polarized light irradiation, and photo alignment may be performed by polarized light irradiation after performing the immobilization by non-polarized light irradiation. In order to obtain high retardation, it is preferable that only polarized light irradiation is performed or polarized light irradiation is performed in advance. It is preferable to perform the polarized light irradiation in an inert gas atmosphere where the oxygen concentration is 0.5% or less. The irradiation energy is preferably 20 mJ/cm$^2$ to 10 J/cm$^2$ and more preferably 100 to 800 mJ/cm$^2$. The illuminance is preferably 20 to 1000 mW/cm$^2$, more preferably 50 to 500 mW/cm$^2$, and still more preferably 100 to 350 mW/cm$^2$. The kind of the liquid crystal compound to be cured by polarized light irradiation is not particularly limited, and a liquid crystal compound having an ethylenically unsaturated group as a reactive group is preferable.

In addition, examples of a method of distorting the cholesteric liquid crystalline phase by polarized light irradiation to cause in-plane retardation to occur include a method using a dichroic liquid crystalline polymerization initiator (WO03/054111A1) and a method using a rod-shaped liquid crystal compound having a photo-alignable functional group such as a cinnamoyl group in the molecule (JP2002-6138A).

The light to be irradiated may be ultraviolet light, visible light, or infrared light. That is, the light with which the liquid crystal compound is polymerizable may be appropriately selected depending on the liquid crystal compound including a coating film, the polymerization initiator, and the like.

In a case where the composition layer is irradiated with polarized light by using the dichroic radical polymerization initiator as the polymerization initiator, the polymerization of the liquid crystal compound having a molecular axis in a direction that matches the polarization direction can be more suitably made to progress.

The in-plane slow axis direction, the in-plane fast axis direction, the refractive index nx, and the refractive index ny can be measured using M-2000 UI (manufactured by J. A. Woollam Co., Ltd.) as a spectroscopic ellipsometer. The refractive index nx and the refractive index ny can be obtained from a measured value of a phase difference $\Delta n \times d$ using measured values of an average refractive index $n_{ave}$ and a thickness d. Here, $\Delta n = nx - ny$, and the average refractive index $n_{ave} = (nx + ny)/2$. In general, since the average refractive index of liquid crystal is about 1.5, nx and ny can be obtained using this value. In addition, in-plane slow axis direction, the in-plane fast axis direction, the refractive index nx, and the refractive index ny of the cholesteric liquid crystal layer used in the present invention are measured, a wavelength (for example, a wavelength 100 nm longer than a longer wavelength side end of the selective wavelength) longer than the selective reflection wavelength (in the case of the present invention, the selective reflection wavelength of the primary light) is set as a measurement wavelength. As a result, the influence of retardation derived from the cholesteric selective reflection on a rotary polarization component is reduced as far as possible. Therefore, the measurement can be performed with high accuracy.

In addition, the cholesteric liquid crystal layer having the refractive index ellipsoid can be formed by stretching the cholesteric liquid crystal layer after applying the composition for forming the cholesteric liquid crystal layer, after immobilizing the cholesteric liquid crystalline phase, or in a state where the cholesteric liquid crystalline phase is semi-immobilized.

In a case where the cholesteric liquid crystal layer having the refractive index ellipsoid is formed by stretching, the stretching may be monoaxial stretching or biaxial stretching. In addition, stretching conditions may be appropriately set depending on the material, the thickness, the desired refractive index nx, and the desired refractive index ny of the cholesteric liquid crystal layer. In the case of monoaxial stretching, the stretching ratio is preferably 1.1 to 4. In the case of biaxial stretching, a ratio between the stretching ratio of one stretching direction and the stretching ratio of another stretching direction is preferably 1.1 to 2.

<<Action of Cholesteric Liquid Crystal Layer>>

An action of the cholesteric liquid crystal layer (band pass filter) having the above-described configuration will be described below in detail.

In a case where the light (primary light) having the selective reflection wavelength is incident into the cholesteric liquid crystal layer 26, the incident light is reflected from the cholesteric liquid crystalline phase.

Here, in a case where the cholesteric liquid crystal layer 26 has the above-described refractive index ellipsoid, not only the primary light but also the secondary light are reflected.

The center wavelength of the secondary light has a length that is about half of the length of the selective reflection center wavelength $\lambda$ of the primary light. In addition, the bandwidth (half-width) of the secondary reflected light is less than the bandwidth of the primary reflected light. In addition, although the primary light is any of right circularly polarized light or left circularly polarized light depending on the turning direction of the cholesteric liquid crystalline phase, the secondary light includes both components of right circularly polarized light and left circularly polarized light.

Figure 6:
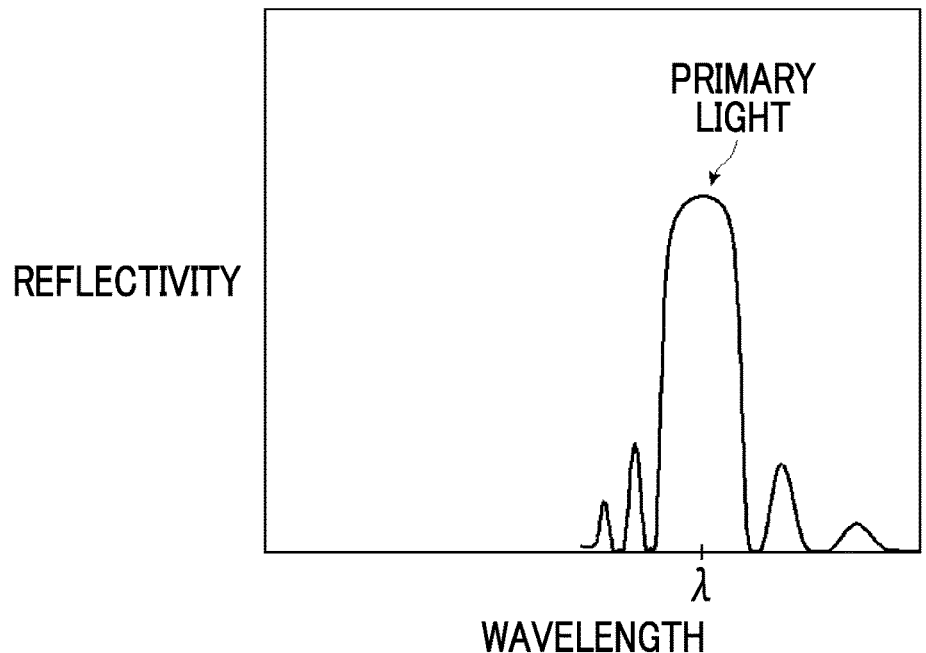
FIG. 6 is a graph conceptually showing an example of light reflection properties of a typical cholesteric liquid crystal layer.
Figure 7:
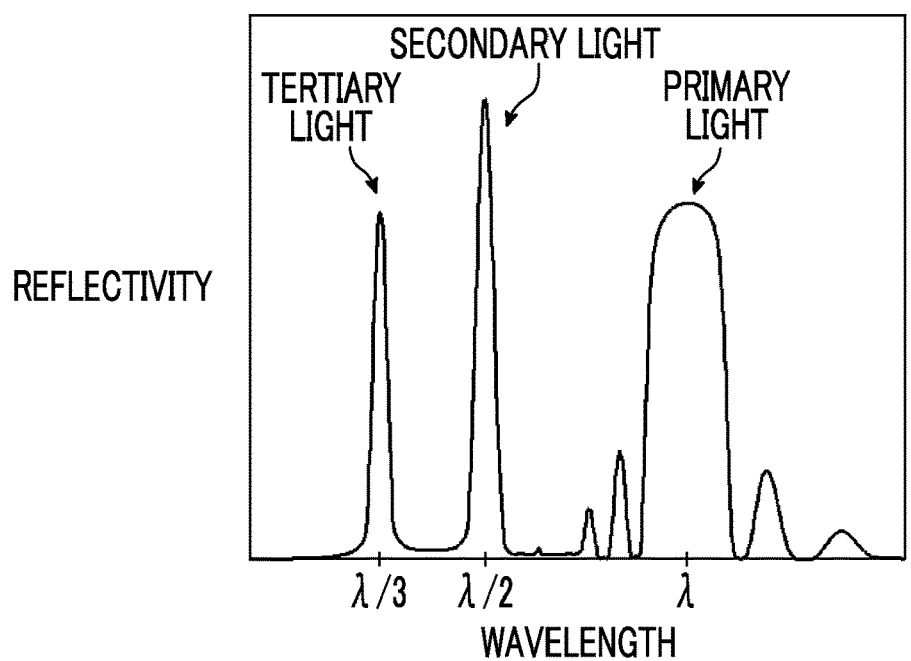
FIG. 7 is a graph conceptually showing an example of light reflection properties of the band pass filter in the sensor according to the present invention.

FIG. 6 conceptually shows reflection characteristics of a general cholesteric liquid crystal layer not having a refractive index ellipsoid. FIG. 6 and FIG. 7 shown below are graphs conceptually showing reflection characteristics in which the horizontal axis represents a wavelength and the vertical axis represents a reflectivity.

The general cholesteric liquid crystal layer has wavelength selectivity in reflection, and thus reflects light in a wavelength range near the selective reflection center wavelength $\lambda$ at a substantially uniformly high reflectivity as shown in FIG. 6. The reflected light having the selective reflection peak in a wavelength range including the selective reflection center wavelength $\lambda$ is the primary light. In addition, the reflectivity with respect to light in a wavelength range other than the vicinity of the selective reflection center wavelength $\lambda$ is low.

On the other hand, as shown in FIG. 7, the cholesteric liquid crystal layer having the refractive index ellipsoid reflects not only light (primary light) in a wavelength range in the vicinity of the selective reflection center wavelength $\lambda$ but also light (secondary light) in a wavelength range in the vicinity of the wavelength $\lambda/2$ at a high reflectivity. As shown in FIG. 7, the half-width of the second selective reflection peak at the wavelength $\lambda/2$ is narrower than the half-width of the first selective reflection peak at the wavelength $\lambda$ and is 30 nm or less.

Accordingly, the sensor 10 according to the embodiment of the present invention using the band pass filter 16 in which the cholesteric liquid crystal layer 26 having the refractive index ellipsoid is provided causes the measurement light reflected from the object O to be reflected from the band pass filter 16 and to be incident into the light-receiving element 14 such that the light incident into the light-receiving element 14 is only the light in a narrow wavelength range reflected from the band pass filter 16.

Therefore, in the sensor 10 according to the embodiment of the present invention, only predetermined light in a narrow wavelength range can be made to be incident into the light-receiving element 14 without reflecting external light from the band pass filter 16. Therefore, noise generated from external light can be significantly reduced, and high-accuracy measurement can be performed at a high SN ratio.

As described above, in the sensor 10, in the configuration where the measurement light is reflected to be incident into the light-receiving element 14 using the second selective reflection peak of the cholesteric liquid crystal layer 26 appearing at the wavelength $\lambda/2$, the light source 12 may emit the light at the wavelength $\lambda/2$.

On the other hand, as shown in FIG. 7, the cholesteric liquid crystal layer 26 having the refractive index ellipsoid reflects not only light (primary light) in a wavelength range in the vicinity of the selective reflection center wavelength and light (secondary light) in a wavelength range in the vicinity of the wavelength $\lambda/2$ but also light (tertiary light) in a wavelength range in the vicinity of the wavelength $\lambda/3$ at a high reflectivity. The half-width of the tertiary light is narrower than the half-width of the primary light and is 30 nm or less. Accordingly, the sensor 10 may use a third selective reflection peak of the cholesteric liquid crystal layer 26 appearing at the wavelength $\lambda/3$. Specifically, the light source 12 may emit the measurement light having the wavelength λ/3 and may cause the measurement light having the wavelength λ/3 reflected from the object O to be reflected from the band pass filter 16 (cholesteric liquid crystal layer 26) and to be incident into the light-receiving element 14.

Further, the cholesteric liquid crystal layer 26 having the refractive index ellipsoid has a high-order selective reflection peak such as a fourth selective reflection peak appearing at a wavelength λ/4 or a fifth selective reflection peak appearing at a wavelength λ/5. Accordingly, the sensor 10 may use the high-order selective reflection peak of the cholesteric liquid crystal layer 26. However, as the order increases, the reflectivity at the selective reflection peak decreases. Therefore, it is preferable to use the second selective reflection peak or the third selective reflection peak, and it is more preferable to use the second selective reflection peak.

Here, from the viewpoint of further reducing the bandwidth (half-width) of the secondary light, it is preferable that an absolute value of an in-plane retardation $Re=(nx-ny) \times d$ is 10 nm or more.

As described above, the thickness of the cholesteric liquid crystal layer 26 forming the band pass filter 16 is not particularly limited. Accordingly, the thickness of the cholesteric liquid crystal layer 26 may be appropriately set depending on the selective reflection wavelength range of the band pass filter 16, the reflectivity required for the band pass filter 16, and the like.

In the sensor 10 according to the embodiment of the present invention, for example, in a case where the object O is measured using the wavelength of the second selective reflection peak, The band pass filter 16 may reflect not only the light in the wavelength range of the second selective reflection peak of the cholesteric liquid crystal layer but also the light in the selective reflection peak wavelength (the wavelength range of the first selective reflection peak) and the light in the wavelength range of the third selective reflection peak. Therefore, in a case where the light in the selective reflection wavelength range and the light in the wavelength range of the third selective reflection peak are incident into the band pass filter 16, the incident light is reflected from the band pass filter 16 and measured by the light-receiving element 14 such that noise is generated and the SN ratio decreases.

Figure 8:
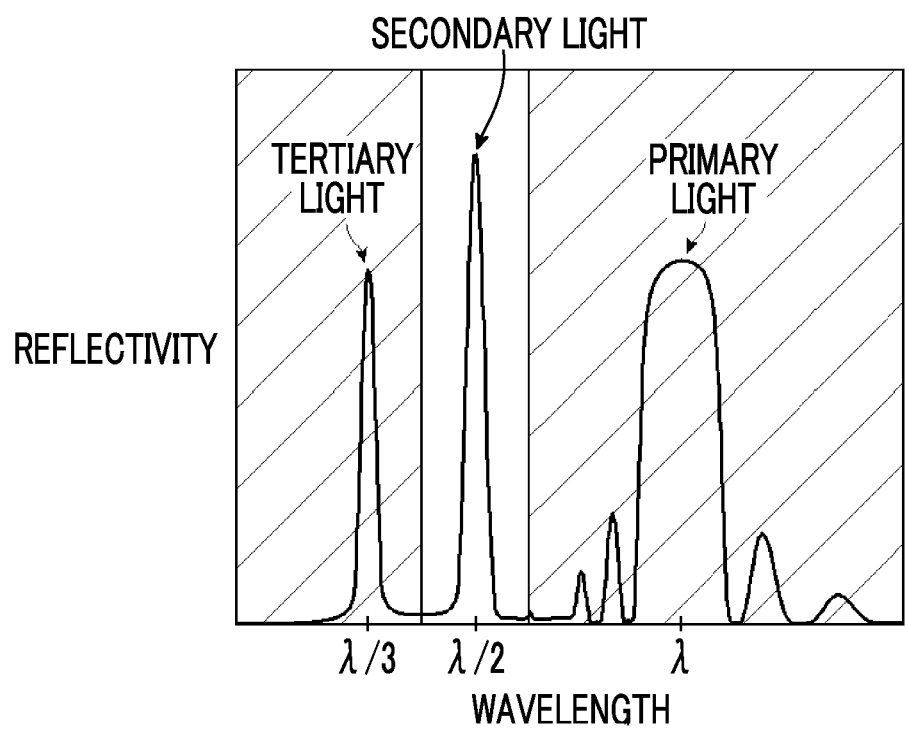
FIG. 8 is a conceptual diagram showing an example of a light shielding member used in the sensor according to the present invention.

In order to prevent the problem, in the sensor 10 according to the embodiment of the present invention, as conceptually indicated by an oblique line in FIG. 8, it is preferable to provide at least one of a light shielding member that shields light in a wavelength λ−100 nm or more of the first selective reflection peak of the band pass filter 16 or a light shielding member that shields light in a wavelength 212-50 nm or less of the second selective reflection peak, and it is more preferable to provide both of the light shielding members.

As a result, light in a wavelength range other than the wavelength range of the second selective reflection peak is prevented from being incident into the light-receiving element 14 such that the SN ratio can be prevented from decreasing.

As the light shielding member, various well-known filters can be used. Accordingly, light shielding from the light shielding member may be absorption or reflection.

The disposition position of the light shielding member is not particularly limited as long as light emitted from the light source 12 is reflected from the object O, is reflected from the band pass filter 16, and is on the optical path until the light is incident into the light-receiving element 14. It is preferable that the disposition position of the light shielding member is near the light-receiving element 14.

As described above, in the sensor according to the embodiment of the present invention, it is preferable to make the wavelength of the light source and the wavelength of the second selective reflection peak (high-order selective reflection peak) of the band pass filter match. Here, the wavelength of the light source may change depending on an external environment such as an environmental temperature. Therefore, it may be desirable that the wavelength of the second selective reflection peak of the band pass filter changes depending on a temperature change. For example, in a case where a semiconductor laser is used as the light source, along with a temperature increase by 40° C., the wavelength of emitted light increases by about 10 nm.

In order to change the wavelength of the second selective reflection peak of the band pass filter depending on a temperature change, it is preferable that the thermal expansion coefficient of the cholesteric liquid crystal layer of the band pass filter increases to expand depending on a temperature change. That is, it is preferable to make a change rate of the wavelength of the light source and a change rate of the reflection wavelength of the cholesteric liquid crystal layer of the band pass filter depending on a temperature change match. In a case where the cholesteric liquid crystal layer of the band pass filter thermally expands in a thickness direction, the helical pitch P changes and the selective reflection wavelength (wavelength of the first selective reflection peak) also changes. Therefore, the wavelength of the second selective reflection peak also changes.

In addition to the method of increasing the thermal expansion coefficient of the cholesteric liquid crystal layer, a material that causes the thermal expansion coefficient of the support of the cholesteric liquid crystal layer to be a negative value, that is, of which the length decreases along with a temperature increase may be used. By using a support formed of the material that causes the thermal expansion coefficient to be a negative value as the support, along with a temperature increase, the support contracts in an in-plane direction such that the thickness of the cholesteric liquid crystal layer changes to increase. In a case where the cholesteric liquid crystal layer thermally expands in a thickness direction, the helical pitch P changes and the selective reflection wavelength (wavelength of the first selective reflection peak) also changes. Therefore, the wavelength of the second selective reflection peak also changes.

As the material that causes the thermal expansion coefficient to be a negative value, materials derived from various physical origins such as a transverse oscillation mode, a rigid unit mode, or a phase transition, for example, cubic zirconium tungstate, a rubbery elastomer, quartz, zeolite, high-purity silicon, cubic scandium fluoride, high-strength polyethylene fiber, or the like is known, and the materials are also described in detail in Sci. Technol. Adv. Mater. 13(2012)013001.

Figure 10:
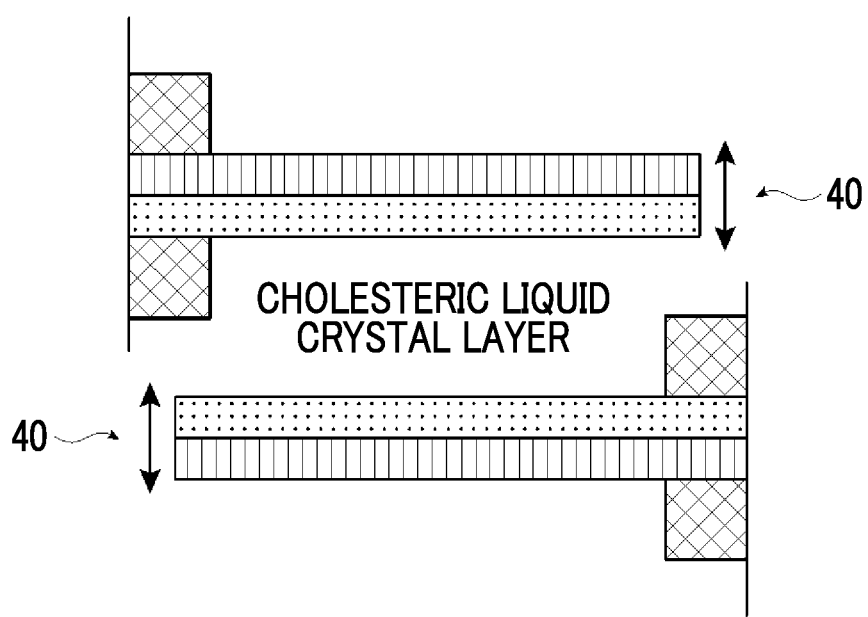
FIG. 10 is a top view conceptually showing another example of the band pass filter in the sensor according to the present invention.

In addition, by forcibly applying an external force in an in-plane direction of the cholesteric liquid crystal layer to expand and contract cholesteric liquid crystal layer, the wavelength of the second selective reflection peak of the band pass filter may change. For example, as shown in FIG. 10 in a case where the cholesteric liquid crystal layer is interposed with bimetal 40 from both sides in case of being seen from the upper surface, the cholesteric liquid crystal layer can be caused to expand and contract depending on a temperature change to control the temperature dependence of the selective reflection peak wavelength. Any mechanism that imparts another displacement may be provided. As a result, the selective peak wavelength can be controlled to have any temperature dependence depending on various external stimuli. As shown in Examples below, the selective peak wavelength may be adjusted to have the temperature dependence of the wavelength of the light source or may be adjusted such that the temperature dependence is zero.

Figure 9:
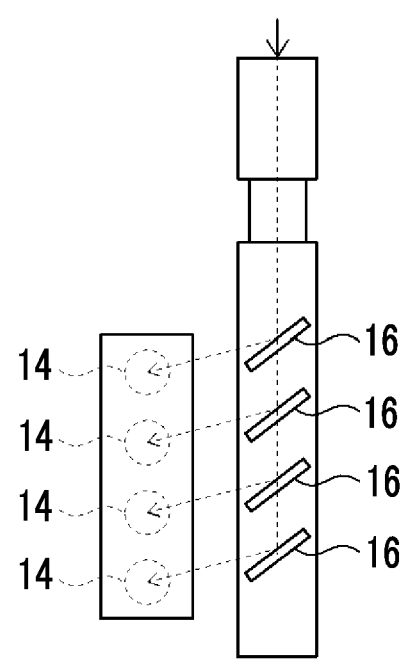
FIG. 9 is a diagram conceptually showing an example of a wavelength selective element including the sensor according to the present invention.

The sensor according to the embodiment of the present invention can be used for various applications such as a sensor that selects only a wavelength included in required information. For example, the sensor can be used as a wavelength selective element for optical communication used in a communication field described in WO2018/010675A. For example, as in the example shown in FIG. 9, with the configuration including a plurality of band pass filters 16 having different selective reflection peak wavelengths and a plurality of light-receiving elements 14, the sensor can be used as a wavelength selective element that selectively acquires light having a plurality of given wavelengths.

In the sensor according to the embodiment of the present invention, by imparting a bias to the monotonous periodic structure of the liquid crystal compound having refractive index anisotropy in the cholesteric liquid crystal layer and utilizing the high-order periodic component and small phase control, new narrow wavelength range characteristics can be generated. In a cholesteric liquid crystal layer other than the cholesteric liquid crystal layer obtained by alignment of the liquid crystal compound, this mechanism can be realized by arranging an alignment element having refractive index anisotropy with a structural bias. For example, the mechanism can also be realized using a method of three-dimensionally laminating aligned anisotropic polymers, a method of using anisotropic polymerization, or a method using a fine structure having a size less than a wavelength of light, that is, a metamaterial.

Hereinabove, the sensor according to the embodiment of the present invention has been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film P-1 was formed.

Coating Liquid for Forming Alignment Film

| The following material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment

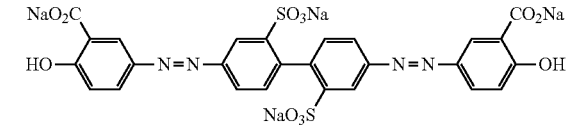

(Exposure of Alignment Film)

By irradiating the obtained alignment film P-1 with polarized ultraviolet light (50 mJ/cm$^2$, using an extra high pressure mercury lamp), the alignment film was exposed.

(Formation of Cholesteric Liquid Crystal Layer)

As the liquid crystal composition, the following composition A-1 was prepared. This composition A-1 is a liquid crystal composition forming a cholesteric liquid crystal layer (cholesteric liquid crystalline phase) that has a selective reflection center wavelength of 1280 nm and reflects right circularly polarized light.

| Composition A-1 | |
|---|---|
| Rod-shaped liquid crystal compound L-1 | 100.00 parts by mass |
| Polymerization initiator LC-1-1 | 4.00 parts by mass |
| Chiral agent Ch-1 | 2.30 parts by mass |
| Leveling agent T-1 | 0.08 parts by mass |
| Methyl ethyl ketone | 159.00 parts by mass |

Rod-Shaped Liquid Crystal Compound L-1

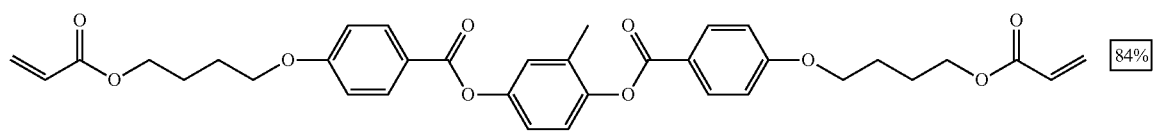

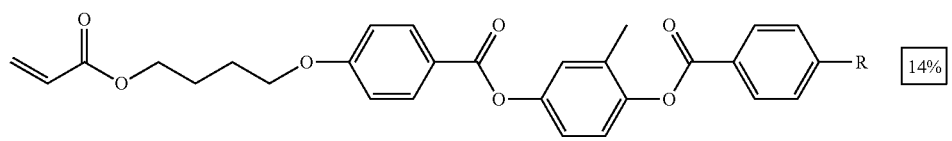

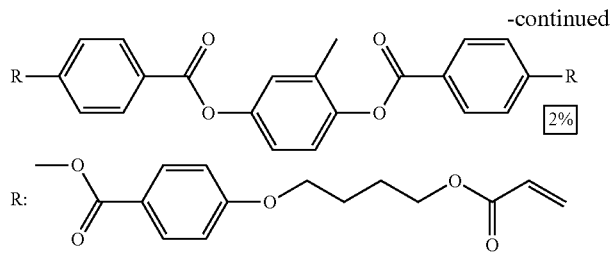

Polymerization Initiator (LC-1-1)

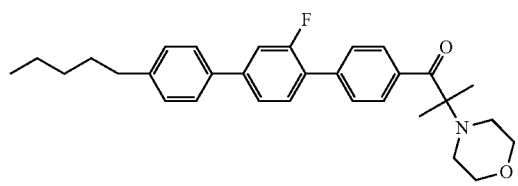

Chiral Agent Ch-1

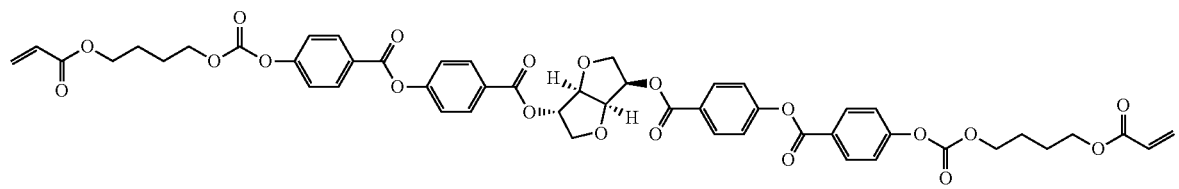 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Leveling Agent T-1

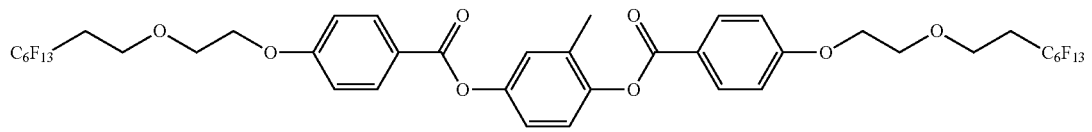

(Polarized UV Irradiation Device)

By using, as an ultraviolet (UV) light source, a microwave-powered ultraviolet irradiation device (Light Hammer 10, 240 W/cm, Fusion UV systems GmbH) on which D-bulb having a strong emission spectrum in 350 to 400 nm was mounted, a wire grid polarization filter (ProFlux PPL 02 (high transmittance type), manufactured by Moxtek, Inc) was provided at a position 10 cm distant from the irradiation surface to prepare the polarized UV irradiation device. The maximum illuminance of the device was 400 mW/cm².

The following composition A-1 was applied to the alignment film P-1 to form a coating film, and the applied coating film was heated using a hot plate at 95° C. Next, after being cooled to 80° C., the coating film was irradiated with ultraviolet light having a wavelength of 365 nm at an illuminance of 200 mW/cm² and an irradiation dose of 300 mJ/cm² using the polarized UV irradiation device in a nitrogen atmosphere. As a result, the alignment of the liquid crystal compound was immobilized, and a cholesteric liquid crystal layer was formed.

In a case where a cross-section of the cholesteric liquid crystal layer was observed with a SEM, the cholesteric liquid crystalline phase had 6 pitches.

(Evaluation of Band Pass Filter)

Reflection (transmission) characteristics of the band pass filter (cholesteric liquid crystal layer) prepared in Example 1 were measured using a spectrophotometer (UV-3150, manufactured by Shimadzu Corporation). As a result, it was verified that the band pass filter had the reflection center wavelength of 1268 nm, the first selective reflection peak having a half-width of 110 nm, the reflection center wavelength of 634 nm, and the second selective reflection peak having a half-width of 12 nm. In addition, the retardation Re of the cholesteric liquid crystal layer was 70 nm.

(Preparation of Sensor)

A laser light source that emitted light having a center wavelength of 633 nm, a LED light source (where a yellow phosphor is formed on a blue LED), and a light-receiving element were prepared. The laser light source corresponds to a light source that emits the measurement light according to the embodiment of the present invention, and the LED light source emitted light corresponding to external light.

The sensor was prepared such that light was emitted from each of the light sources to a white plate as the object and the light reflected from the white plate is caused to be reflected from the band pass filter and to be incident into the light-receiving element. The band pass filter was disposed such that the light emitted from the laser light source and reflected from the white plate was incident from a direction tilted by 5° with respect to the perpendicular line of the surface of the band pass filter. The light-receiving element was disposed such that reflected light from the band pass filter was vertically incident into the light-receiving surface.

Comparative Example 1

A configuration not including the band pass filter in Example 1 was adopted as a sensor according to Comparative Example 1.
(Evaluation of Sensor)

Light was emitted from the laser light source and the LED light source to the white plate, and the light reflected from the white plate was measured with the light-receiving element.

As a result, as compare to the sensor according to Comparative Example 1, in the sensor according to Example 1, noise generated from the LED light source was reduced, and the laser light was able to be detected.

Example 2

As the support, a commercially available acrylic film (TECHNOLLOY, manufactured by Sumika Acryl Co., Ltd) was prepared.
(Formation of Alignment Film)

The following coating liquid for forming an alignment film was applied to a surface of the support using a #10 wire bar coater. The support on which the coating film was formed was dried using warm air at 90° C. for 180 seconds to form an alignment film.

Coating Liquid for Forming Alignment Film

| | |
|---|---|
| Polyvinyl alcohol PVA-203 (manufactured by Kuraray Co., Ltd.) | 10.00 parts by mass |
| Water | 90.00 parts by mass |

(Rubbing of Alignment Film)

The formed alignment film surface was rubbed once in the one in-plane direction at 500 rpm to form a rubbed alignment film.
(Coating Liquid for Forming Cholesteric Liquid Crystal Layer)

As the liquid crystal composition, the following composition A-2 was prepared. This composition A-2 is a liquid crystal composition forming a cholesteric liquid crystal layer (cholesteric liquid crystalline phase) that has a selective reflection center wavelength of 1570 nm and reflects right circularly polarized light.

| Composition A-2 | |
|---|---|
| Rod-shaped liquid crystal compound L-2 | 100.00 parts by mass |
| Polymerization initiator F-1 | 3.00 parts by mass |
| Chiral agent Ch-1 | 2.00 parts by mass |
| Leveling agent T-1 | 0.08 parts by mass |
| Methyl ethyl ketone | 157.40 parts by mass |

Rod-Shaped Liquid Crystal Compound L-2

Polymerization Initiator F-1

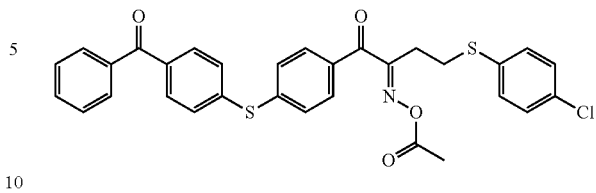

(Formation of Cholesteric Liquid Crystal Layer)

The coating liquid A-2 for forming a cholesteric liquid crystal layer was applied to the rubbed alignment film using a #16 wire bar coater. After the application, the coating film was heated and dried at a film surface temperature of 100° C. for 1 minute for aging to form a cholesteric liquid crystal layer having a uniform cholesteric liquid crystalline phase.

Further, immediately after aging, the cholesteric liquid crystal layer was irradiated with UV (illuminance: 50 mW/cm$^2$, irradiation dose: 20 mJ/cm$^2$) in a nitrogen atmosphere where the oxygen concentration was 0.3% or less. As a result, the cholesteric liquid crystalline phase was immobilized, and a cholesteric liquid crystal layer was prepared.

(Stretching of Cholesteric Liquid Crystal Layer)

The support to which the prepared cholesteric liquid crystal layer was applied was cut in a size of 10×10 cm, and a fixed end was monoaxially stretched at a temperature of 120° C. and a stretching ratio of 1.3 times to obtain a cholesteric liquid crystal layer.

(Evaluation of Band Pass Filter)

Reflection (transmission) characteristics of the band pass filter (cholesteric liquid crystal layer) prepared in Example 2 were measured using a spectrophotometer (UV-3150, manufactured by Shimadzu Corporation). As a result, it was verified that the band pass filter had the reflection center wavelength of 1270 nm, the first selective reflection peak having a half-width of 115 nm, the reflection center wavelength of 635 nm, and the second selective reflection peak having a half-width of 23 nm. In addition, the retardation Re of the cholesteric liquid crystal layer was 50 nm.

(Evaluation of Sensor)

A sensor was prepared using the same method as that of Example 1 by disposing the light source, the white plate, the band pass filter, and the light-receiving element, and light reflected from the white plate was measured.

As a result, as compare to the sensor according to Comparative Example 1, in the sensor according to Example 2, noise generated from the LED light source was reduced, and the laser light was able to be detected.

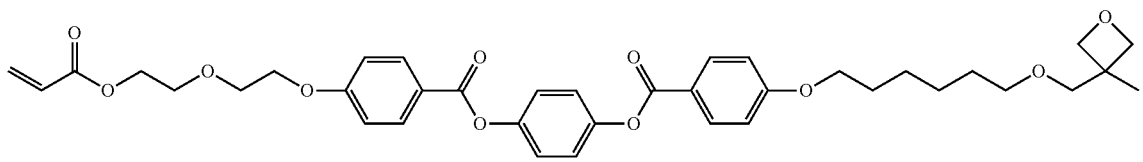 [SMILES: C=CC(=O)OCCOCCOc1ccc(C(=O)Oc2ccc(OC(=O)c3ccc(OCCCCCCOCC4(C)COC4)cc3)cc2)cc1]

Example 3

A sensor was prepared using the same method as that of Example 1, except that the following light shielding member was disposed between the light-receiving element and the band pass filter.

(Light Shielding Member)

As the light shielding member, two light shielding members including a long pass filter (LV0590, manufactured by Asahi Spectra Co., Ltd.) that shielded light in a wavelength range of 590 nm or less and a short pass filter (ET750sp-2p-IR, manufactured by Hitec Multiplex Japan Inc.) that shielded light in a wavelength range of 750 nm or more were used.

(Evaluation of Sensor)

A sensor was prepared using the same method as that of Example 1 by disposing the light source, the white plate, the band pass filter, the light shielding members, and the light-receiving element, and light reflected from the white plate was measured.

As a result, as compare to the sensor according to Example 1, in the sensor according to Example 3, noise generated from the LED light source was further reduced, and the sensitivity of laser light was improved.

Example 4

(Formation of Alignment Film)

The alignment film P-1 was formed using the same method as that of Example 1.

(Exposure of Alignment Film)

The alignment film P-1 was exposed with the polarized UV irradiation device using the same method as that of Example 1.

(Coating Liquid for Forming Cholesteric Liquid Crystal Elastomer)

As the liquid crystal composition, the following composition A-3 was prepared. This composition A-3 is a liquid crystal composition forming an elastomer of a cholesteric liquid crystal layer (cholesteric liquid crystalline phase) that has a selective reflection center wavelength of 1280 nm and reflects left circularly polarized light.

| Composition A-3 | |
|---|---|
| Rod-shaped liquid crystal compound L-3 | 100.00 parts by mass |
| Polymerization initiator LC-1-1 | 4.00 parts by mass |
| Chiral agent Ch-2 | 3.50 parts by mass |
| Leveling agent T-1 | 0.08 parts by mass |
| Crosslinking agent (VISCOAT #230, manufactured by Osaka Organic Chemical Industry Ltd.) | 6.5 parts by mass |
| Liquid crystal solvent (5CB, manufactured by Tokyo Chemical Industry Co., Ltd.) | 50.00 parts by mass |
| Methyl ethyl ketone | 171.12 parts by mass |

Rod-Shaped Liquid Crystal Compound L-3

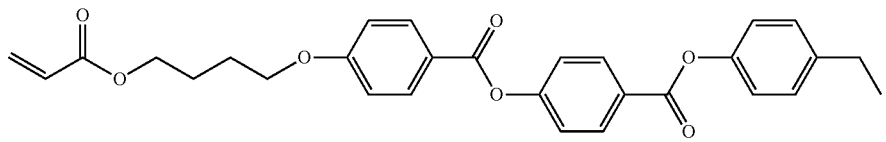 [SMILES: C=CC(=O)OCCCCOc1ccc(C(=O)Oc2ccc(C(=O)Oc3ccc(CC)cc3)cc2)cc1]

Chiral Agent Ch-2

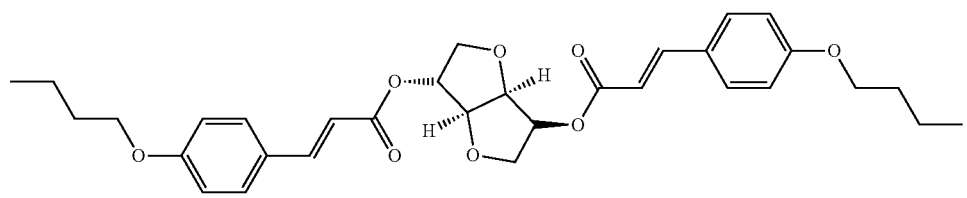

(Formation of Cholesteric Liquid Crystal Elastomer)

The above-described composition A-3 was applied to the alignment film P-1. The applied coating film was heated to 95° C. using a hot plate, was cooled to 80° C., and was irradiated (illuminance: 200 mW/cm$^2$ and irradiation dose: 600 mJ/cm$^2$) with polarized UV using the polarized UV irradiation device in a nitrogen atmosphere. As a result, the cholesteric liquid crystalline phase was immobilized to form a liquid crystal gel.

After peeling the liquid crystal gel from the alignment film P-1, the liquid crystal gel was dipped in methyl ethyl ketone in a stainless steel tray and was cleaned to remove the liquid crystal solvent. After cleaning, the liquid crystal gel was dried in an oven at 100° C. for 15 minutes to form a liquid crystal elastomer in which the cholesteric liquid crystalline phase was immobilized. This liquid crystal elastomer was the band pass filter according to Example 4.

(Evaluation of Band Pass Filter)

Reflection (transmission) characteristics of the band pass filter prepared in Example 4 were measured using a spectrophotometer (UV-3150, manufactured by Shimadzu Corporation). As a result, it was verified that the band pass filter had the reflection center wavelength of 1268 nm, the first selective reflection peak having a half-width of 110 nm, the reflection center wavelength of 634 nm, and the second selective reflection peak having a half-width of 20 nm. In addition, the retardation Re of the cholesteric liquid crystal layer was 60 nm.

A sensor was prepared using the same method as that of Example 1 by disposing the light source, the white plate, the band pass filter, and the light-receiving element, and light reflected from the white plate was measured at 25° C.

As a result, as compare to the sensor according to Comparative Example 1, in the sensor according to Example 4, noise generated from the LED light source was reduced, and the laser light was able to be detected.

Example 5

(Formation of Support)

A polycrystalline sintered compact (ceramic) sample of $\beta$-$Cu_{1.8}Zn_{0.2}V_2O_7$ was prepared using a solid phase reaction method. Specifically, CuO, ZnO, and $V_2O_5$ weighed at the stoichiometric ratio were mixed with each other in a mortar, and the mixture was heated in air at a temperature of 873 to 953 K for 10 hours. The obtained powder was sintered using a spark plasma sintering (SPS) furnace (manufactured by SPS SYNTEX) to obtain an oxide sintered compact. The sintering was performed in a vacuum (<$10^{-1}$ Pa) using a graphite die at 723 K for 5 minutes. The support was formed using this sample.

In a case where the linear thermal expansion coefficient $\alpha$ of the formed support was measured using a laser thermal expansion system (LIX-2, manufactured by ULVAC), a was $-14$ ppm/° C. (Measurement Temperature Range of 100 K to 700 K)

(Formation of Alignment Film)

The alignment film P-1 was formed on the support using the same method as that of Example 1.

(Exposure of Alignment Film)

The alignment film P-1 was exposed with the polarized UV irradiation device using the same method as that of Example 1.

(Formation of Cholesteric Liquid Crystal Layer)

A cholesteric liquid crystal layer was formed using the same method as that of Example 2.

(Evaluation of Band Pass Filter)

Reflection (transmission) characteristics of the band pass filter (cholesteric liquid crystal layer) prepared in Example 5 were measured using a spectrophotometer (UV-3150, manufactured by Shimadzu Corporation). As a result, it was verified that the band pass filter had the reflection center wavelength of 1270 nm, the first selective reflection peak having a half-width of 115 nm, the reflection center wavelength of 635 nm, and the second selective reflection peak having a half-width of 23 nm. In addition, the retardation Re of the cholesteric liquid crystal layer was 70 nm.

(Evaluation of Sensor)

A sensor was prepared using the same method as that of Example 1 by disposing the light source, the white plate, the band pass filter, and the light-receiving element, and light reflected from the white plate was measured.

As a result, as compare to the sensor according to Comparative Example 1, in the sensor according to Example 5, noise generated from the LED light source was reduced, and the laser light was able to be detected.

Example 6

(Formation of Support)

The support was formed using the same method as that of Example 5.

(Formation of Alignment Film)

The alignment film P-1 was formed on the support using the same method as that of Example 1.

(Exposure of Alignment Film)

The alignment film P-1 was exposed with the polarized UV irradiation device using the same method as that of Example 1.

(Formation of Cholesteric Liquid Crystal Elastomer)

A cholesteric liquid crystal elastomer was formed using the same method as that of Example 4.

(Evaluation of Band Pass Filter)

Reflection (transmission) characteristics of the band pass filter (cholesteric liquid crystal elastomer) prepared in Example 6 were measured using a spectrophotometer (UV-3150, manufactured by Shimadzu Corporation). As a result, it was verified that the band pass filter had the reflection center wavelength of 1268 nm, the first selective reflection peak having a half-width of 110 nm, the reflection center wavelength of 634 nm, and the second selective reflection peak having a half-width of 12 nm. In addition, the retardation Re of the cholesteric liquid crystal layer was 70 nm.

(Evaluation of Sensor)

A sensor was prepared using the same method as that of Example 1 by disposing the light source, the white plate, the band pass filter, and the light-receiving element, and light reflected from the white plate was measured.

As a result, as compare to the sensor according to Comparative Example 1, in the sensor according to Example 6, noise generated from the LED light source was reduced, and the laser light was able to be detected.

Example 7

The cholesteric liquid crystal layer according to Example 4 was peeled off from the support and was positioned to have a structure the cholesteric liquid crystal layer was interposed with bimetal in a case where the cholesteric liquid crystal layer was seen from the top as in the configuration of FIG. 10. As the bimetal, BL series (manufactured by Hitachi Metals Neomaterial, Ltd.) was used, and the cholesteric liquid crystal layer was fixed to be positioned between the two bimetals. In a case where the temperature changed, the bimetal was displaced such that the cholesteric liquid crystal layer expanded and contracted. This way, a band pass filter was prepared.

(Evaluation of Sensor)

A sensor was prepared using the same method as that of Example 1 by disposing the light source, the white plate, the band pass filter, and the light-receiving element, and light reflected from the white plate was measured.

As a result, as compare to the sensor according to Comparative Example 1, in the sensor according to Example 7, noise generated from the LED light source was reduced, and the laser light was able to be detected.

(Evaluation of Temperature Dependence of Reflection Characteristic of Band Pass Filter)

The reflection characteristic of the second selective reflection peak of the band pass filter prepared in each of Examples 1, 2, and 4 to 7 were measured using a spectrophotometer (UV-3150, manufactured by Shimadzu Corporation) at temperatures of 25° C., 45° C., and 65° C., and the results thereof are collectively shown in Table 1.

TABLE 1

| | Example 1 | Example 2 | Example 4 | Example 5 | Example 6 | Example 7 |
|---|---|---|---|---|---|---|
| 25° C. | 634 nm | 635 nm | 634 nm | 635 nm | 634 nm | 634 nm |
| 35° C. | 634 nm | 635 nm | 640 nm | 636 nm | 641 nm | 642 nm |
| 45° C. | 635 nm | 636 nm | 645 nm | 638 nm | 647 nm | 648 nm |
| 65° C. | 637 nm | 638 nm | 656 nm | 643 nm | 660 nm | 662 nm |

As compared to the band pass filters according to Examples 1 and 2, in Example 4 in which the liquid crystal elastomer was used for the cholesteric liquid crystal, Example 5 in which the support was formed of a material having a negative thermal expansion coefficient, Example 6 in which the liquid crystal elastomer was used for the cholesteric liquid crystal and the support was formed of the material having a negative thermal expansion coefficient, and Example 7 in which expansion and contraction of liquid crystal by external displacement (bimetal) was used, the shift width of the reflection wavelength caused by a temperature increase can be increased.

As can be seen from the above results, the effects of the present invention are obvious.

The present invention is suitably applicable to various sensors that performs optical measurement, for example, a distance-measuring sensor.

EXPLANATION OF REFERENCES

10: sensor
12: light source
14: light-receiving element
16: band pass filter
20: support
24: alignment film
26: cholesteric liquid crystal layer
32: liquid crystal compound
40: bimetal
O: object
P: helical pitch

What is claimed is:

1. A sensor comprising:
a light source;
a band pass filter; and
a light-receiving element,
wherein the band pass filter includes a cholesteric liquid crystal layer that is a layer obtained by immobilizing a cholesteric liquid crystalline phase,
the cholesteric liquid crystal layer has a region where a refractive index nx in an in-plane slow axis direction and a refractive index ny in an in-plane fast axis direction satisfy nx>ny,
in a case where a selective reflection center wavelength of the cholesteric liquid crystal layer is represented by $\lambda$, the cholesteric liquid crystal layer has a second selective reflection peak at a wavelength $\lambda/2$ and a half-width of the second selective reflection peak at $\lambda/2$ is 30 nm or less,
the light source emits light having a wavelength in a wavelength range of the second selective reflection peak,
the light-receiving element has sensitivity to light having a wavelength in a wavelength range of the second selective reflection peak, and
the light source emits light toward an object, the band pass filter reflects light having the wavelength of the second selective reflection peak in the light reflected from the object, and the light-receiving element receives light having the wavelength of the second selective reflection peak and being reflected from the band pass filter.

2. The sensor according to claim 1,
wherein an absolute value of an in-plane phase difference Re of the cholesteric liquid crystal layer is 10 nm or more.

3. The sensor according to claim 1,
wherein the cholesteric liquid crystal layer has a third selective reflection peak at a wavelength $\lambda/3$ and a half-width of the third selective reflection peak at $\lambda/3$ is 30 nm or less.

4. The sensor according to claim 1,
wherein a half-width of a selective reflection peak at the selective reflection center wavelength of the cholesteric liquid crystal layer is 30 nm or more.

5. The sensor according to claim 1,
wherein the cholesteric liquid crystal layer consists of a liquid crystal elastomer.

6. The sensor according to claim 1,
wherein the cholesteric liquid crystal layer is a liquid crystal elastomer having temperature responsiveness in which the selective reflection peak at the selective reflection center wavelength is shifted to a longer wavelength side along with a temperature increase.

7. The sensor according to claim 1, further comprising:
an external displacement mechanism that expands and contracts the liquid crystal cholesteric liquid crystal layer.

8. The sensor according to claim 1, further comprising:
at least one of a light shielding member that shields 80% or more of light in a wavelength range of $\lambda$-100 nm or more or a light shielding member that shields 80% or more of light in a wavelength range of $\lambda/2$-50 nm or less.

9. The sensor according to claim 2,
wherein the cholesteric liquid crystal layer has a third selective reflection peak at a wavelength $\lambda/3$ and a half-width of the third selective reflection peak at $\lambda/3$ is 30 nm or less.

10. The sensor according to claim 2,
wherein a half-width of a selective reflection peak at the selective reflection center wavelength of the cholesteric liquid crystal layer is 30 nm or more.

11. The sensor according to claim 2,
wherein the cholesteric liquid crystal layer consists of a liquid crystal elastomer.

12. The sensor according to claim 2,
wherein the cholesteric liquid crystal layer is a liquid crystal elastomer having temperature responsiveness in which the selective reflection peak at the selective reflection center wavelength is shifted to a longer wavelength side along with a temperature increase.

13. The sensor according to claim 2, further comprising:
an external displacement mechanism that expands and contracts the liquid crystal cholesteric liquid crystal layer.

14. The sensor according to claim 2, further comprising:
at least one of a light shielding member that shields 80% or more of light in a wavelength range of $\lambda$-100 nm or more or a light shielding member that shields 80% or more of light in a wavelength range of $\lambda/2$-50 nm or less.

15. The sensor according to claim 3,
wherein a half-width of a selective reflection peak at the selective reflection center wavelength of the cholesteric liquid crystal layer is 30 nm or more.

16. The sensor according to claim 3,
wherein the cholesteric liquid crystal layer consists of a liquid crystal elastomer.

17. The sensor according to claim 3,
wherein the cholesteric liquid crystal layer is a liquid crystal elastomer having temperature responsiveness in which the selective reflection peak at the selective reflection center wavelength is shifted to a longer wavelength side along with a temperature increase.

18. The sensor according to claim 3, further comprising:
an external displacement mechanism that expands and contracts the liquid crystal cholesteric liquid crystal layer.

19. The sensor according to claim 3, further comprising:
at least one of a light shielding member that shields 80% or more of light in a wavelength range of $\lambda$-100 nm or more or a light shielding member that shields 80% or more of light in a wavelength range of $\lambda/2$-50 nm or less.

20. The sensor according to claim 4,
wherein the cholesteric liquid crystal layer consists of a liquid crystal elastomer.

\* \* \* \* \*